(12) United States Patent
Reinis

(10) Patent No.: US 7,117,740 B2
(45) Date of Patent: Oct. 10, 2006

(54) REMOTE VISUAL LIQUID QUANTITY INDICATOR

(75) Inventor: Filip A. Reinis, Long Beach, CA (US)

(73) Assignee: Honeywell International, Inc., Morristown, NJ (US)

(*) Notice: Subject to any disclaimer, the term of this patent is extended or adjusted under 35 U.S.C. 154(b) by 0 days.

(21) Appl. No.: 11/032,419

(22) Filed: Jan. 10, 2005

(65) Prior Publication Data

US 2006/0196261 A1 Sep. 7, 2006

(51) Int. Cl.
*G01F 23/58* (2006.01)
(52) U.S. Cl. .............................. 73/321; 73/149; 73/318
(58) Field of Classification Search ..................... None
See application file for complete search history.

(56) References Cited

U.S. PATENT DOCUMENTS

| | | | |
|---|---|---|---|
| 1,170,290 A | 2/1916 | Lindsay | |
| 1,266,742 A | 5/1918 | Worthington et al. | |
| 1,682,286 A | 8/1928 | Kinzbach | |
| 2,722,835 A | 11/1955 | Ragland | |
| 4,167,874 A * | 9/1979 | Grant | 73/290 R |
| 5,649,450 A * | 7/1997 | Glab et al. | 73/307 |
| 2001/0013261 A1* | 8/2001 | Murg | 74/502.5 |
| 2004/0255712 A1* | 12/2004 | Ruhlander | 74/502.4 |

* cited by examiner

*Primary Examiner*—Hezron Williams
*Assistant Examiner*—Paul M. West
(74) *Attorney, Agent, or Firm*—Oral Caglar, Esq.

(57) ABSTRACT

A remote visual liquid quantity indicator comprises a flexible cable within a flexible outer sleeve and allows a user to remotely determine the level of a liquid in a container, such as an accumulator without the need for electrical power or a direct line of sight to the container. The flexible cable may be coupled between a reservoir sweeper of the accumulator and an indicator. Changes in the fluid level of the accumulator may provide a linear movement to the flexible cable, which in turn provides a change to the measurement reading of the indicator. The flexible cable/outer sleeve allows for the complex routing scenarios necessary in the congested spaces surrounding aircraft accumulators.

30 Claims, 4 Drawing Sheets

REMOTE VISUAL LIQUID QUANTITY INDICATOR

BACKGROUND OF THE INVENTION

The present invention generally relates to methods and apparatus for determining the fluid level of a container, such as an accumulator, and more specifically, to methods and apparatus for determining the fluid level of a container without the need for either electrical power or a direct line of sight to the container.

Accumulators are frequently used on military and commercial aircraft to accommodate the thermal expansion of coolant and hydraulic fluids. During aircraft servicing, maintenance personnel need to ascertain if the respective liquid loop contains the appropriate fluid level. Often, the accumulator is located in an inconvenient space for visual inspection and there is no aircraft electrical power available to operate a level sensor incorporating a rotary variable differential transformer (RVDT) or a potentiometer.

A measuring device for a tank is disclosed in U.S. Pat. No. 1,170,290. A float is attached to a rigid rod and as the float rises and falls, the rod moves in a linear direction. A vertical tubular member (guide tube) positioned inside the tank guides the movement of the rod. An indicator connected to the rod and positioned outside the tank determines the fluid level inside the tank. The rod and guide tube are positioned in a direct line of sight to the indicator. In an alternate embodiment, a chain is used in place of the rod. This device may not be useful for some applications because indicator placement requires a direct line of sight to the fluid container (tank). This requirement greatly limits the functionality and location of the remote indicator, especially in situations where the fluid container is almost surrounded by other components, beyond which a remote indicator is desired.

A fluid measuring device not requiring a direct line of sight between the fluid container and the indicator is disclosed in U.S. Pat. No. 1,266,743. The described device includes a float attached to a piano wire. The wire raises and lowers as the float raises and lowers. The wire is housed in a copper tube that can be bent to allow misalignment between the indicator and the liquid level. Although this method does not require a direct line of sight to the indicator, it may not be suitable for some applications. For some aircraft applications, for example, installation of the copper tube requires repeatedly bending and unbending the tube to position it around the various components. For some applications requiring complex routing scenarios through congested spaces, installation of the described device may be challenging.

As can be seen, there is a need for improved methods and apparatus for determining the fill level of a container, such as an accumulator, at a location more convenient for maintenance and without the need for electrical power or a direct line of sight to the accumulator.

SUMMARY OF THE INVENTION

In one aspect of the present invention, an apparatus for remotely measuring fluid level in a container comprises a flexible cable assembly having a first end portion and a second end portion; a fill responsive member in contact with the first end portion; and an indicator assembly in contact with the second end portion.

In another aspect of the present invention, an apparatus for measuring a fluid in a container comprises a reservoir sweeper having a first side and a second side, the first side in contact with an expansion space of the container, the second side in contact with the fluid; and a push/pull member in contact with the first side, the push/pull member capable of translating a linear motion of the reservoir sweeper to a measurement change in an indicator assembly.

In still another aspect of the present invention, an apparatus for measuring a fluid in an accumulator comprises a flexible cable assembly having a push/pull member coaxially within an outer jacket, the push/pull member in contact with a reservoir sweeper of the accumulator and capable of carrying a linear movement from the reservoir sweeper to an indicator assembly.

In yet another aspect of the present invention, an apparatus for measuring a fluid in an accumulator comprises an indicator assembly; a push/pull member disposed coaxially within an outer jacket, the push/pull member between and in communication with the indicator assembly and a fill responsive member of the accumulator.

In another aspect of the present invention, an apparatus for measuring a fluid in an accumulator comprises a stainless steel cable in communication with a reservoir sweeper of the accumulator, the reservoir sweeper capable of providing a linear movement to the stainless steel cable; a flexible tube positioned radially outward from the stainless steel cable, the flexible tube comprising a material selected from the group consisting of nylon and polytetrafluoroethylene; and an indicator assembly in communication with the stainless steel cable and capable of receiving the linear movement from the stainless steel cable and providing a measurement of the fluid.

In a further aspect of the present invention, a method for remotely determining the level of a fluid in a container comprises the steps of translating a linear motion of a reservoir sweeper of the container into a linear motion of a push/pull member; translating the linear motion of the push/pull member into a change in an indicator assembly positioned at a remote location; and translating the change in the indicator assembly into a measurement of the fluid.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides apparatus and methods to remotely determine the amount of liquid in a container, such as an accumulator on an aircraft. Often the accumulator may be located in an inconvenient space wherein fluid levels may not be viewed easily. The present invention allows for the determination of accumulator fill level in a location more convenient for a user, such as a maintainer, without the need for electrical power or a direct line of sight to the accumulator. The apparatus and methods according to the present invention may find beneficial use in many industries including aerospace, automotive, and electricity generation. This invention may be useful in any container fill indicator application.

In one embodiment, the present invention provides an apparatus for remote liquid quantity indication. The apparatus may comprise a flexible cable positioned between and in contact with a float and a remote indicator. Unlike the prior art rigid rod, the flexible cable does not require the remote indicator being located linearly from the container, thereby allowing greater flexibility in remote indicator placement. Unlike the prior art bendable copper tube, the flexible cable can be "threaded" or "fished" around components, thereby allowing for complex routing scenarios through congested spaces.

Figure 1:
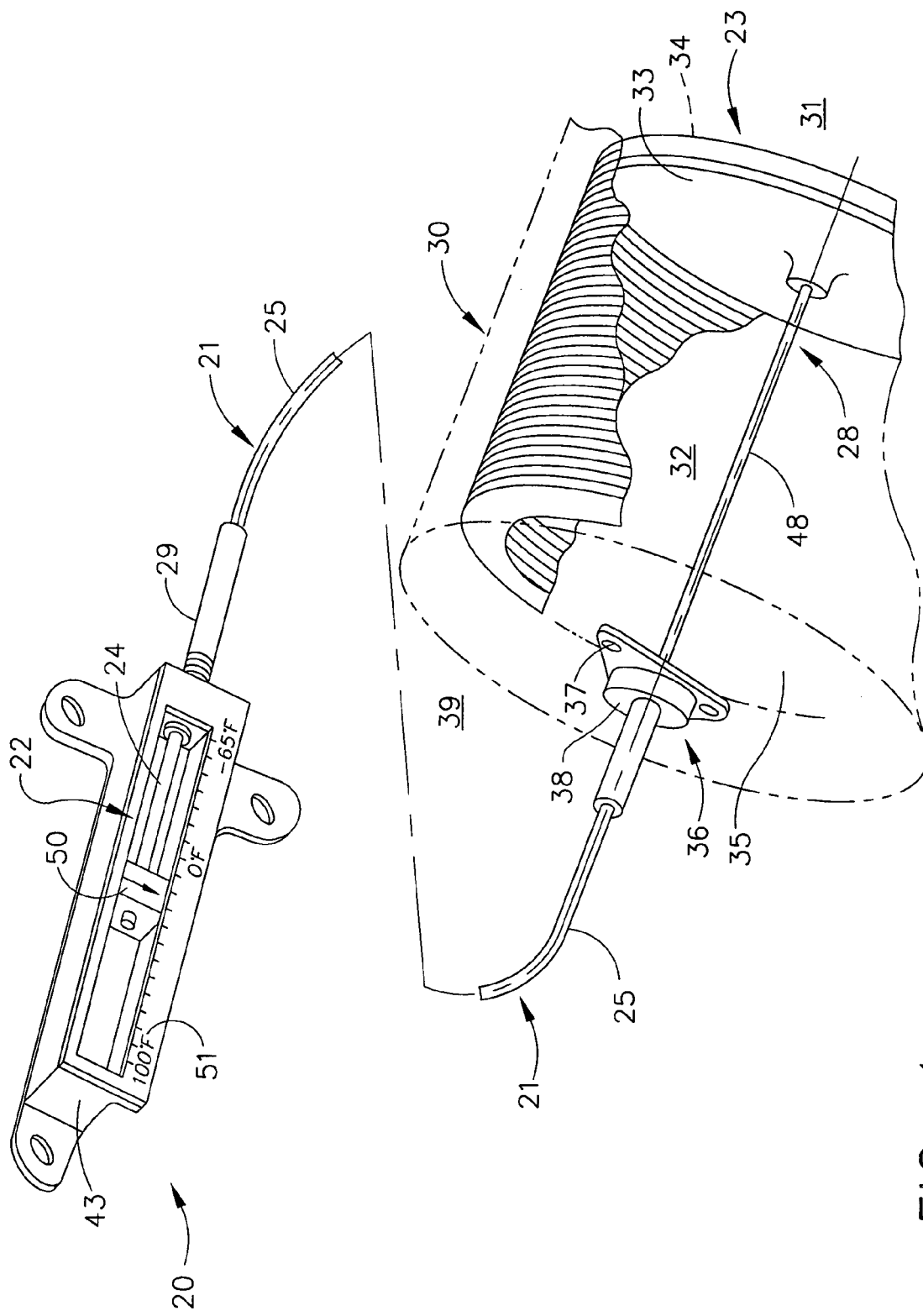
FIG. 1 is a perspective view of a remote visual liquid quantity indicator assembly according to one embodiment of the present invention.

Referring to FIG. 1, there is shown a perspective view of a remote visual liquid quantity indicator apparatus 20 according to one embodiment of the present invention. The remote visual liquid quantity indicator apparatus 20 may comprise a flexible cable assembly 21 positioned between and in communication with a fill responsive member, such as a reservoir sweeper 23, and an indicator assembly 22. The remote visual liquid quantity indicator apparatus 20 may be used to determine the level of a fluid 31 within a container, such as an accumulator 30.

The container may be any fluid holding container, such as a tank, a vat or the accumulator 30. The accumulator 30 may be a metal bellows, rolling diaphragm or piston-type accumulator, as are well known in the art. No specific form of the accumulator 30 is required, so long as there is a portion thereof, as discussed below, that may move with changes in the level of the fluid 31 within the accumulator 30.

Figure 2:
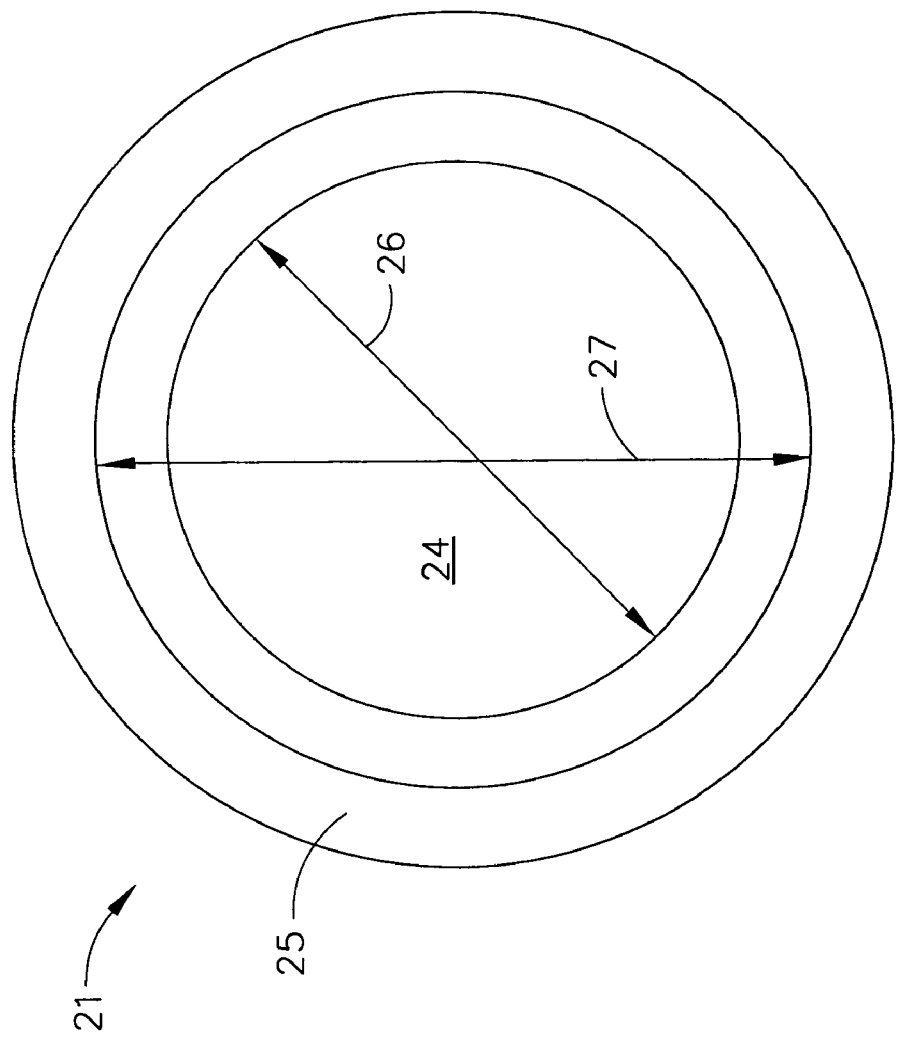
FIG. 2 is a cross-sectional view of a flexible cable assembly according to one embodiment of the present invention.

The flexible cable assembly 21 may be capable of carrying linear movement from the reservoir sweeper 23 to the indicator assembly 22. For example, in some embodiments (not shown) the flexible cable assembly 21 may be made of a solid or hollow flexible member, such as a solid or hollow flexible polymer or metal. Alternatively, and as shown in FIGS. 1 and 2, the flexible cable assembly 21 may contain a push/pull member 24 provided coaxially within an outer jacket 25. The latter arrangement may be used to provide protection to the push/pull member 24.

The push/pull member 24 may comprise a cable, such as a stainless steel cable. The push/pull member 24 may comprise a wire. The push/pull member 24 may comprise a metal, a metal alloy, or a polymer. Any flexible cable or wire may be useful with the present invention. The push/pull member 24 may be capable of transferring linear movement of the reservoir sweeper 23 to the indicator assembly 22.

The outer jacket 25 of the flexible cable assembly 21 may comprise a flexible tube. The outer jacket 25 may comprise a polymer, such as a nylon or polytetrafluoroethylene (Teflon®). For some applications exposed to cutting or pinching hazards, the outer jacket 25 may comprise a braided metal sleeve with a polymer liner (not shown). The outer jacket 25 may protect the push/pull cable 24. The dimensions of the outer jacket 25 may be such that the push/pull member 24 may be capable of moving linearly within the outer jacket 25. A diameter 26 of the push/pull member 24 may be less than an inner diameter 27 of the outer jacket 25.

The flexible cable assembly 21 may have a first end portion 28 and a second end portion 29. The first end portion 28 may be the portion towards the container and the second end portion 29 may be the portion towards the indicator. The first end portion 28 may be in contact with the fill responsive member. Fill responsive member is a generic term and may include any component capable of linear movement in response to changing fluid levels, such as the reservoir sweeper 23, a piston (not shown), or a float (not shown). The reservoir sweeper 23 may be included within a container, such as the accumulator 30. The reservoir sweeper 23 may separate a volume of fluid 31 from an expansion space 32. The reservoir sweeper 23 may have a first side 33 and a second side 34. The first side 33 may be the side in contact with the expansion space 32 and the second side 34 may be the side in contact with the volume of fluid 31. The reservoir sweeper 23 may allow for the expansion and contraction of the volume of fluid 31. The reservoir sweeper 23 may move with changes in the level of the fluid 31 within the accumulator 30.

The push/pull member 24 at the first end portion 28 of the flexible cable assembly 21 may be attached to the first side 33 of the reservoir sweeper 23. For some applications, the outer jacket 25 also may be terminated within the expansion space 32. For some applications, the outer jacket 25 may be attached to an exterior surface 35 of the accumulator 30 by an external connecting member 36. The external connecting member 36 may contain bores 37 for affixing the external connecting member 36 to the exterior surface 35. The external connecting member 36 may include a seal 38 to separate the expansion space 32 from an exterior space 39. The exterior space 39 may be a space external to the accumulator 30. The seal 38 may be particularly useful in gas pressurized accumulators 30, wherein pressurized gas is provided in the expansion space 32 to exert pressure against the first side 33 of the reservoir sweeper 23. For some applications, such as gas pressurized accumulators 30, the push/pull member 24 may incorporate a solid cylindrical section 48 that may pass through the seal 38. The solid cylindrical section 48 may be connected to the reservoir sweeper 23 whereby linear movement of the reservoir sweeper 23 may be translated into linear movement of the push/pull member 24.

Figure 3:
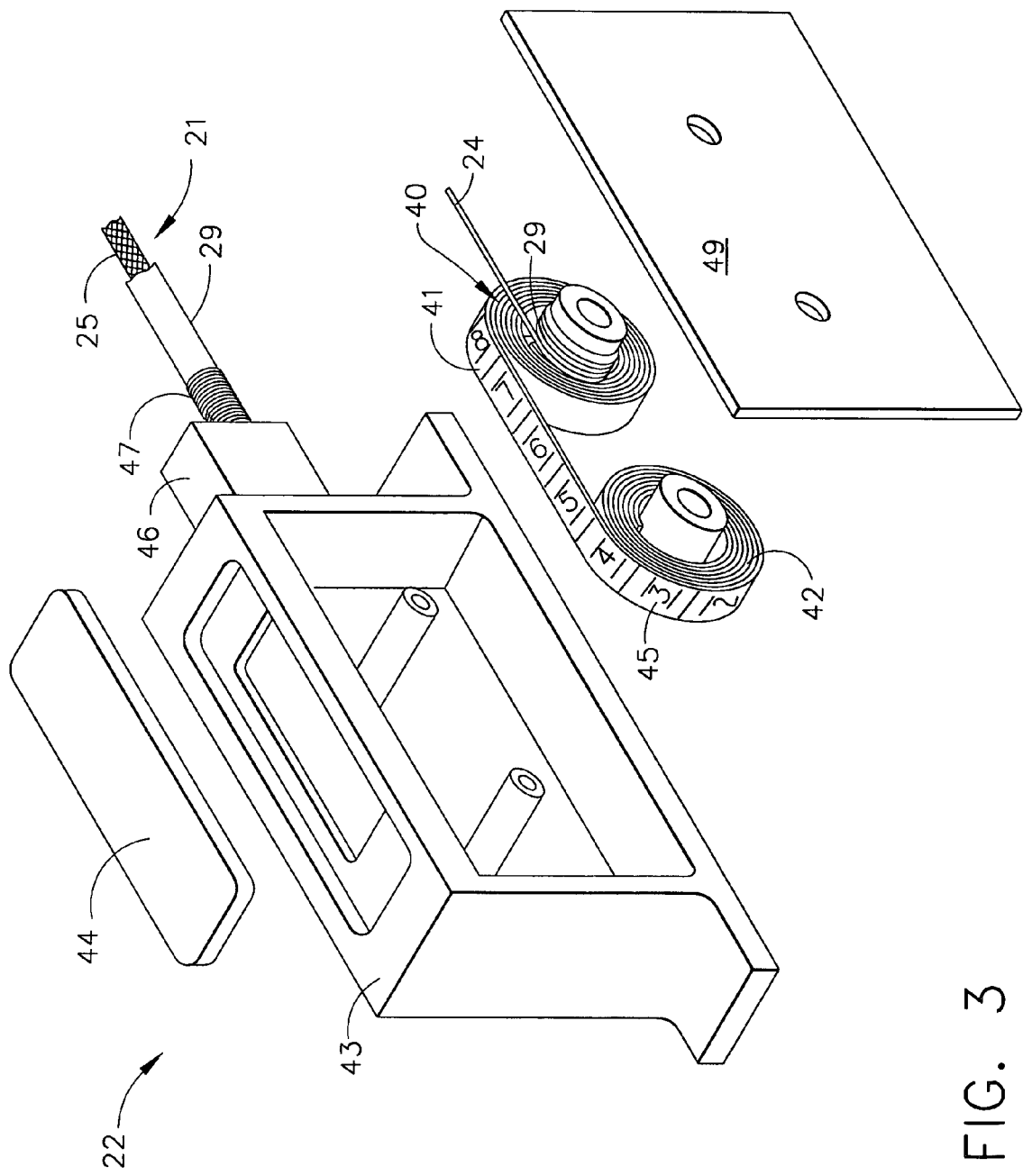
FIG. 3 is an exploded perspective view of an indicator assembly according to one embodiment of the present invention.

The second end portion 29 of the flexible cable assembly 21 may be in contact with the indicator assembly 22. For some applications, the outer jacket 25 may be attached to an indicator housing 43 by a connector apparatus 46, as depicted in FIG. 3. The connector apparatus 46 may contain a thread 47 for coupling the connector apparatus 46 to the outer jacket 25. The push/pull member 24 may be operationally connected to the indicator assembly 22. The indicator assembly 22 may be capable of measuring the linear movement of the push/pull member 24. Indicator assemblies 22 capable of measuring linear movement are well known in the art. For example, the linear movement of the push/pull member 24 may be transferred to a ratio drum 40, as depicted in FIG. 3. The ratio drum 40 may transfer the movement to a quantity band 41. The indicator assembly 22 may include a clock spring 42 to provide tension to the quantity band 41, preventing slack from forming along the quantity band 41. The indicator assembly 22 may include the indicator housing 43 and a cover 49. An indicator window 44 may be provided in the indicator housing 43 to allow for determining the position of the quantity band 41. A ruled scale 45 may be provided on the quantity band 41 to allow a user to coordinate the movements of the quantity band 41 with changes in fluid levels. Alternatively, a quantity scale 51 may be provided on the indicator housing 43, as depicted in FIG. 1. In this embodiment, the linear movement of the push/pull member 24 may be transferred to a pointer 50. The position of the quantity band 41 and the pointer 50 may be read by any conventional means in addition to the ruled scale 45 and the quantity scale 51 as described above. For example, the position of the quantity band 41 and the pointer 50 may be translated to a numerical readout.

Figure 4:
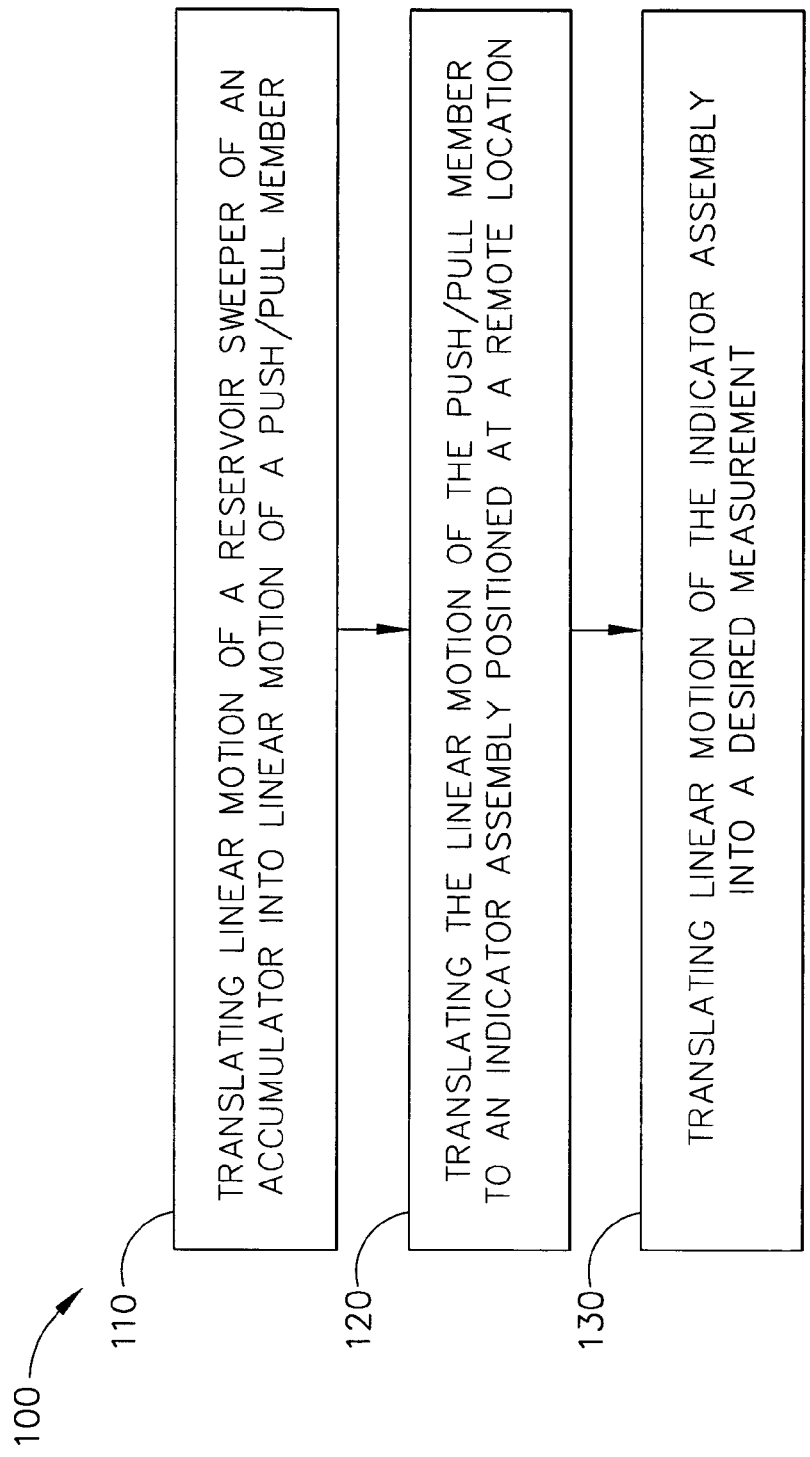
FIG. 4 is a flow chart representing steps involved in a method for remote visual liquid quantity indication according to another embodiment of the present invention.

The present invention also provides for a method 100 for remotely determining the level or quantity of a fluid in an accumulator, as depicted in FIG. 4. A step 110 may involve translating linear motion of a reservoir sweeper of an accumulator into linear motion of a push/pull member. A step 120 may involve translating the linear motion of the push/pull member to an indicator assembly positioned at a remote location. For example, step 120 may involve translating linear motion of the push/pull member into linear motion of a quantity band of the indicator assembly. A step 130 may involve translating linear motion of the indicator assembly into a desired measurement. For example, the indicator assembly may be calibrated for measuring volume of fluid in the accumulator or other container. As an example, the indicator assembly may have a quantity band and a ruled scale, as described herein above with reference to FIG. 3.

According to another aspect of the present invention, an increase in temperature may cause an increase in the volume of fluid in the accumulator. Therefore, according to some embodiments of the present invention, it may be desired to measure temperature of the fluid in the accumulator, and the indicator assembly may be calibrated such that the scale on the indicator measures temperature of the fluid in the accumulator.

While the invention has been described with respect to the measurements of fluid within an accumulator, the invention is not so limited, but rather the fluid inside other containers may also be measured, provided that a reservoir sweeper similar to that described with respect to FIG. 1 changes linear position with changing fluid level.

As can be appreciated by those skilled in the art, the present invention provides a remote visual indicator of accumulator fluid level that does not require electrical input power or a direct line of sight to the accumulator.

It should be understood, of course, that the foregoing relates to exemplary embodiments of the invention and that modifications may be made without departing from the spirit and scope of the invention as set forth in the following claims.

I claim:

1. An apparatus for remotely measuring fluid level in a container comprising:
    a flexible cable assembly capable of carrying linear movement having a first end portion and a second end portion;
    a fill responsive member in contact with said first end portion; and
    a remote indicator assembly in mechanical contact with said second end portion, wherein linear movement of said second end portion varies a readout on the remote indicator assembly; and
    an external connecting member located on an exterior surface of said container, said external connecting member having a seal,
    wherein said flexible cable assembly has a solid cylindrical section capable of passing through said seal.

2. The apparatus of claim 1, wherein said container comprises an accumulator.

3. The apparatus of claim 1, wherein said fill responsive member comprises a reservoir sweeper.

4. The apparatus of claim 1, wherein said flexible cable assembly comprises a push/pull member coaxially within an outer jacket.

5. The apparatus of claim 4, wherein said push/pull member comprises a stainless steel cable.

6. The apparatus of claim 4, wherein said outer jacket comprises nylon.

7. The apparatus of claim 4, wherein said outer jacket comprises polytetrafluoroethylene.

8. The apparatus of claim 1, wherein said remote indicator assembly comprises a ratio drum, said ratio drum in contact with a push/pull member of said flexible cable assembly.

9. An apparatus for measuring a fluid in a container comprising:
    a reservoir sweeper having a first side and a second side, said first side in contact with an expansion space of said container, said second side in contact with said fluid;
    a push/pull member having a first end and a second end, said first end in contact with said first side;
    a remote indicator assembly mechanically connected to said second end, said push/pull member capable of translating a linear motion of said reservoir sweeper to a measurement change in said remote indicator assembly; and
    a seal in contact with said expansion space and a solid cylindrical section of said push/pull member such that said expansion space is separated from a space external to said container.

10. The apparatus of claim 9, further comprising an outer jacket disposed radially outward from said push/pull member.

11. The apparatus of claim 10, wherein said outer jacket comprises a flexible tube.

12. The apparatus of claim 10, wherein said outer jacket comprises a braided metal sleeve with a polymer liner.

13. The apparatus of claim 9, wherein said container comprises an accumulator.

14. The apparatus of claim 13, wherein said accumulator is selected from the group consisting of metal bellows, rolling diaphragm and piston-type.

15. The apparatus of claim 9, wherein said indicator assembly measures a volume of said fluid.

16. The apparatus of claim 9, wherein said remote indicator assembly measures a temperature of said fluid.

17. The apparatus of claim 9, wherein said push/pull member has a solid cylindrical section in contact with a seal, said seal capable of separating an expansion space of said container from a space external to said container.

18. An apparatus for measuring a fluid in an accumulator comprising:
    a flexible cable assembly having a push/pull member coaxially within an outer jacket, said push/pull member in contact with a reservoir sweeper of said accumulator and further in contact with a remote indicator assembly external of said accumulator, said flexible cable assembly being capable of carrying a linear movement from said reservoir sweeper to said remote indicator assembly; and
    an external connecting member located on an exterior surface of said accumulator, said external connecting member having a seal,
    wherein said flexible cable assembly has a solid cylindrical section capable of passing through said seal.

19. The apparatus of claim 18, wherein said accumulator comprises a metal bellows type accumulator.

20. The apparatus of claim 18, wherein said accumulator comprises a gas pressurized accumulator.

21. An apparatus for measuring a fluid in an accumulator comprising:
a remote indicator assembly;
a push/pull member disposed coaxially within an outer jacket, said push/pull member between and in mechanical communication with said indicator assembly and a fill responsive member of said accumulator, wherein linear movement of said push/pull member varies a readout on the remote indicator assembly; and
an external connecting member located on an exterior surface of said accumulator, said external connecting member having a seal,
wherein said push/pull member has a solid cylindrical section capable of passing through said seal.

22. The apparatus of claim 21, wherein said outer jacket comprises a material selected from the group consisting of nylon and polytetrafluoroethylene.

23. The apparatus of claim 21, wherein said indicator assembly comprises a pointer in contact with said push/pull member.

24. The apparatus of claim 21, wherein said remote indicator assembly comprises a ratio drum in contact with said push/pull member.

25. The apparatus of claim 21, wherein said remote indicator assembly has a ruled scale calibrated to measure fluid temperature.

26. The apparatus of claim 21, wherein said remote indicator assembly has a ruled scale calibrated to measure fluid volume.

27. An apparatus for measuring a fluid in an accumulator comprising:
a stainless steel cable in communication with a reservoir sweeper of said accumulator, said reservoir sweeper capable of providing a linear movement to said stainless steel cable;
a flexible tube positioned radially outward from said stainless steel cable, said flexible tube comprising a material selected from the group consisting of nylon and polytetrafluoroethylene;
a remote indicator assembly in mechanical communication with said stainless steel cable and capable of receiving said linear movement from the stainless steel cable and providing a measurement of said fluid; and
an external connecting member located on an exterior surface of said acculumator, said external connecting member having a seal,
wherein said flexible tube has a solid cylindrical section capable of passing through said seal.

28. A method for remotely determining the level of a fluid in a container comprising the steps of:
mechanically connecting a first end of a push/pull member with a reservoir sweeper of said container and a second end of said push/pull member with a remote indicator assembly;
passing said push/pull member through an external connecting member located on an exterior surface of said container, said external connecting member having a seal, wherein said push/pull member has a solid cylindrical section capable of passing through said seal;
translating a linear motion of said reservoir sweeper of said container into a linear motion of said push/pull member;
translating said linear motion of the push/pull member into a change in said indicator assembly positioned at a remote location; and
translating said change in the remote indicator assembly into a measurement of said fluid.

29. The method of claim 28, further comprising a step of protecting said push/pull member by disposing said push/pull member coaxially within an outer jacket.

30. The method of claim 28, further comprising a step of sealing an exterior of said container from an expansion space inside said container with a seal.

* * * * *